US010110698B2

(12) United States Patent
Alfred et al.

(10) Patent No.: US 10,110,698 B2
(45) Date of Patent: *Oct. 23, 2018

(54) METHOD AND APPARATUS FOR PROVIDING CONTROL OF SOCIAL NETWORKING SITES

(71) Applicant: AT&T Intellectual Property I, L.P., Atlanta, GA (US)

(72) Inventors: Joseph Anderson Alfred, Fredericksburg, VA (US); Joseph M. Sommer, Rutherford, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 478 days.

This patent is subject to a terminal disclaimer.

(21) Appl. No.: 14/577,570

(22) Filed: Dec. 19, 2014

(65) Prior Publication Data
US 2015/0106465 A1    Apr. 16, 2015

Related U.S. Application Data

(63) Continuation of application No. 12/633,605, filed on Dec. 8, 2009, now Pat. No. 8,935,614.

(51) Int. Cl.
| H04L 29/08 | (2006.01) |
| H04L 12/58 | (2006.01) |
| H04L 29/06 | (2006.01) |

(52) U.S. Cl.
CPC ............ H04L 67/306 (2013.01); H04L 51/32 (2013.01); H04L 63/102 (2013.01)

(58) Field of Classification Search
CPC ............ G06F 3/00; H04L 29/08; H04L 12/58
See application file for complete search history.

(56) References Cited

U.S. PATENT DOCUMENTS

| 7,853,614 | B2* | 12/2010 | Hoffman | G06Q 10/107 |
| | | | | 707/785 |
| 8,103,947 | B2* | 1/2012 | Lunt | G06Q 10/10 |
| | | | | 715/200 |
| 8,375,068 | B1* | 2/2013 | Platt | G06Q 10/10 |
| | | | | 705/7.29 |
| 2005/0015726 | A1* | 1/2005 | Tuominen | G06F 17/30905 |
| | | | | 715/733 |
| 2005/0216300 | A1* | 9/2005 | Appelman | G06Q 10/10 |
| | | | | 705/319 |
| 2006/0248584 | A1* | 11/2006 | Kelly | G06F 21/6245 |
| | | | | 726/18 |
| 2007/0261071 | A1* | 11/2007 | Lunt | G06Q 10/10 |
| | | | | 725/13 |
| 2008/0077595 | A1* | 3/2008 | Leebow | G06Q 10/10 |
| 2008/0126344 | A1* | 5/2008 | Hoffman | G06Q 10/107 |
| 2008/0189380 | A1* | 8/2008 | Bosworth | G06Q 10/10 |
| | | | | 709/207 |

(Continued)

*Primary Examiner* — David Choi

(57) ABSTRACT

A method, computer readable medium and apparatus for providing control of social networking sites are disclosed. For example, the method establishes an owner profile, receives a request from a third party user to post information on a social networking site associated with an owner, determines if the request should be granted in accordance with the owner profile and posts the information on the social networking site associated with the owner if the request is granted.

18 Claims, 4 Drawing Sheets

(56) References Cited

U.S. PATENT DOCUMENTS

| | | | | |
|---|---|---|---|---|
| 2008/0320563 | A1* | 12/2008 | Cornpropst | G06F 21/62 726/3 |
| 2009/0055263 | A1* | 2/2009 | Okubo | G06Q 30/02 705/14.69 |
| 2009/0125521 | A1* | 5/2009 | Petty | G06F 21/604 |
| 2009/0254529 | A1* | 10/2009 | Goldentouch | G06F 17/241 |
| 2009/0319577 | A1* | 12/2009 | Obasanjo | G06Q 10/10 |
| 2010/0036912 | A1* | 2/2010 | Rao | H04L 51/20 709/204 |
| 2010/0042684 | A1* | 2/2010 | Broms | G06F 3/0483 709/204 |
| 2010/0050090 | A1* | 2/2010 | Leebow | G06Q 10/10 715/751 |
| 2010/0088182 | A1* | 4/2010 | Ryder | G06Q 10/107 705/14.66 |
| 2010/0100952 | A1* | 4/2010 | Sample | H04L 51/066 726/9 |
| 2010/0112540 | A1* | 5/2010 | Gross | G09B 5/10 434/351 |
| 2010/0146118 | A1* | 6/2010 | Wie | G06Q 10/10 709/225 |
| 2010/0217721 | A1* | 8/2010 | Wormald | G06Q 10/10 705/319 |
| 2010/0332975 | A1* | 12/2010 | Chang | G06Q 10/107 715/256 |
| 2011/0113349 | A1* | 5/2011 | Kiciman | G06F 17/241 715/753 |
| 2011/0138298 | A1* | 6/2011 | Alfred | H04L 51/32 715/745 |
| 2015/0106465 | A1* | 4/2015 | Alfred | H04L 51/32 709/206 |

\* cited by examiner

METHOD AND APPARATUS FOR PROVIDING CONTROL OF SOCIAL NETWORKING SITES

This application is a continuation of U.S. patent application Ser. No. 12/633,605, filed Dec. 8, 2009, which is currently allowed and is herein incorporated by reference in its entirety.

BACKGROUND

The popularity of social networking sites such as Facebook®, Twitter®, MySpace®, LinkedIn®, etc., are increasing. Social networking sites allow an owner of a social network site webpage to share personal content and information, status or location information with other third party users. However, the social networking sites also allow other users associated with the owner to share thoughts on the owner's page of a social networking site.

Generally, allowing other users to share their thoughts on the page of the social networking site associated with the owner is not a problem because the owner only associates with those people he or she knows. However, if for some reason one of these users associated with the owner decides to post something inappropriate on the page of the social networking site associated with the owner, there is nothing the owner of the page can do to prevent this. Typically, the owner may only take some remedial action after the fact and after the inappropriate comments are already posted on the owner's page of the social networking site. However, the social networking sites do not provide owner control to control what users within a owner's group post or publish on the owner's social networking site page.

SUMMARY

In one embodiment, the present disclosure discloses a method, computer readable medium and apparatus for providing control of social networking sites are disclosed. For example, the method establishes an owner profile, receives a request from a third party user to post information on a social networking site associated with an owner, determines if the request should be granted in accordance with the owner profile and posts the information on the social networking site associated with the owner if the request is granted.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
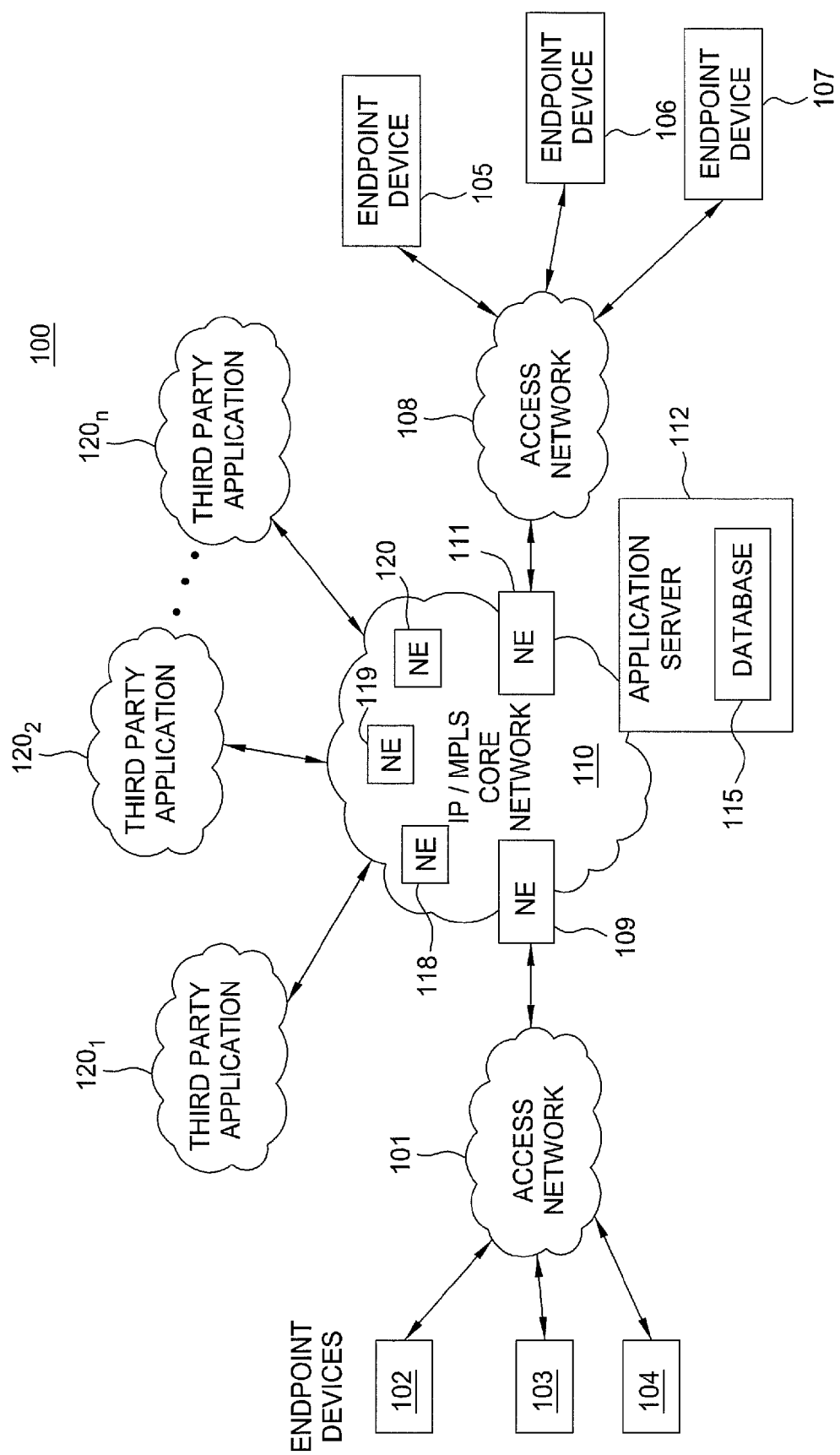
FIG. 1 illustrates an exemplary network related to the present disclosure.

The present disclosure broadly discloses a method and apparatus for providing control of social networking sites. FIG. 1 is a block diagram depicting an exemplary network 100 related to the current disclosure. Exemplary networks include cellular networks, internet protocol networks, packet networks, and the like.

FIG. 1 is a block diagram depicting an exemplary packet network 100 related to the current disclosure. Exemplary packet networks include packet networks, e.g., Internet Protocol (IP) networks, Asynchronous Transfer Mode (ATM) networks, Frame-Relay networks, and the like. An IP network is broadly defined as a network that uses Internet Protocol such as IPv4 or IPv6, and the like to exchange data packets.

In one embodiment, the packet network may comprise a plurality of endpoint devices 102-104 configured for communication with a core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers (e.g., broadly as a border element) for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), and the like.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device.

The IP/MPLS core network 110 may also comprise an application server 112 that contains a database 115. The application server 112 may comprise any server or computer that is well known in the art, and the database 115 may be any type of electronic collection of data that is also well known in the art. In addition, it should be noted that the application server 112 may be physically within the IP/MPLS core network 110 or may be offloaded outside of the IP/MPLS core network 110 and operated by a third party.

In one embodiment, one or more third party applications $120_1$-$120_n$ (hereinafter also collectively referred to as third party applications 120) may be in communication with the IP/MPLS core network 110. For example, the third party applications 120 may be social network websites such as Facebook®, Twitter®, LinkedIn®, MySpace® and the like. Social network websites are broadly described as any website that typically allows an owner of a page on one of the social networking sites to share personal information or content with other users via these websites. The endpoints 102-107 can access the third party applications 120 via the IP/MPLS core network 110.

In one embodiment, each of the third party applications 120 may have their own application server (not shown) for storing a page associated a variety of users. For example, each of the endpoint devices 102-107 may be associated with a different user. Accordingly, each user may have a page for each one of the third party applications 120. The page of a user allows other users to post information on the user's page (hereinafter also generally referred to as a "posting"). In one embodiment, the information includes comments posted on the page, pictures or video.

For example a user associated with endpoint device 102 may have a page on third party application 120₁. Thus, the user is considered an "owner" of a page associated with the third party application 120₁. It should be noted that each third party application 120 can have multiple "owners" as each user can have their own personal page on the third party applications 120.

The owner of a page on a social networking site may accept as "friends" other users associated with endpoint devices 103-107. As a result, the other users associated with the endpoint devices 103-107 may post information on the page of third party application 120₁ belonging to the owner (i.e. the user associated with endpoint device 102).

Typically, these social networking sites provide no control over what is posted on an owner's page once the other users become accepted by the owner of the page. In other words, once an owner accepts another user, the accepted third party user is typically allowed to post information freely on the owner's page. The owner generally may only control what information is posted after the fact (i.e. after the post is already published on their page). In other words, the owner can only delete what has already been posted or "un-accept" the other third party user to prevent further postings from the other third party user. The present disclosure resolves this problem.

It should be noted that although only six endpoint devices, two access networks, and five network elements are depicted in FIG. 1, the communication system 100 may be expanded by including additional endpoint devices, access networks, network elements, application servers or third party applications without altering the scope of the present disclosure. The current disclosure discloses providing control of social network sites in a network, e.g., the network 100 illustrated in FIG. 1 and as described above.

Figure 2:
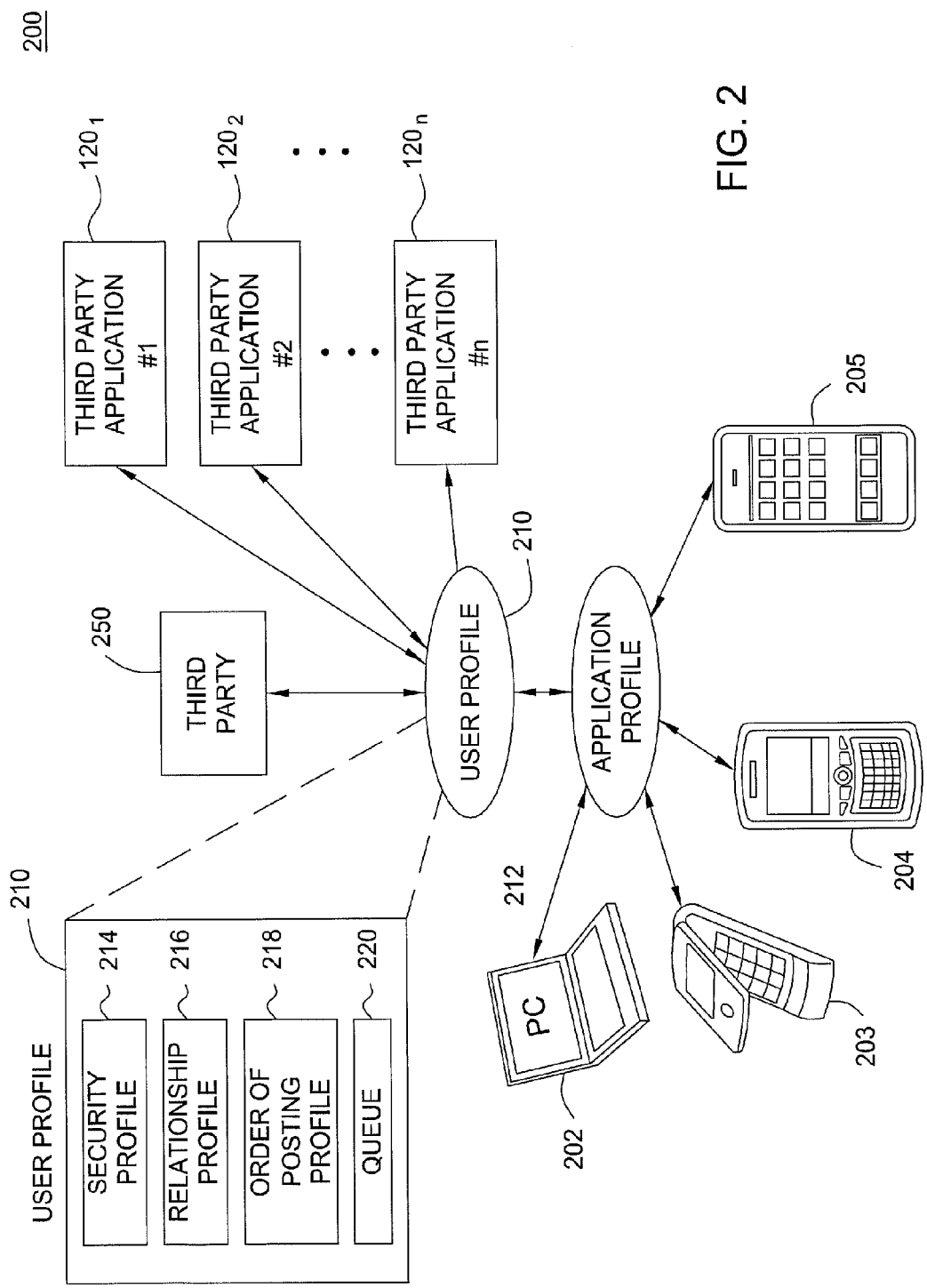
FIG. 2 illustrates a high level block diagram of the present disclosure.

FIG. 2 illustrates a high level block diagram of one embodiment of a system 200 for providing control of social networking sites in a network. In one embodiment, the system 200 includes an owner profile 210. In one embodiment, the owner profile 210 can be embodied by hardware in an application server 112 and stored in a database 115, as described above in FIG. 1.

The owner profile 210 acts as a gateway for access to the owner's pages on various third party applications 120₁-120ₙ. In other words, unlike current social networking sites that allow other third party users to post directly onto an owner's page, the present disclosure requires all requests by other third party users to post information on the owner's page to be filtered through the owner profile 210.

For example, the owner may have a Facebook® page, a Twitter® page, a LinkedIn® page and so forth represented by the third party applications 120₁-120ₙ. When a third party user 250 requests to post something on the owner's page (e.g. a page on one of the third party applications 120₁-120ₙ), the request is approved or denied in accordance with various settings of the owner profile 210.

An owner may establish the owner profile 210 via an interface to the application server 112. For example, the owner may use any one of their endpoint devices 202-205 to define various parameters of any one of the sub-profiles of their owner profile 210, as discussed below. Any type of interface may be used, e.g., a graphical user interface (GUI), a interactive voice response (IVR) system or interaction with a service representative of the service provider.

In one embodiment, the owner profile 210 includes an application profile 212, a security profile 214, a relationship profile 216, an order of posting profile 218 and a queue 220. The application profile 212 includes a profile for how postings should appear or be encoded based upon one or more endpoint devices 202-205 that is used to access the posting. For example, if the owner or the third party user 250 is using a laptop PC 202, the posting may be encoded for a maximum quality and experience. For example, any pictures of video may be viewed, all comments posted may be viewed and the like. However, if the owner or the third party user 250 is using a mobile phone having limited graphical capabilities, e.g., mobile phone 203, the posting may be encoded to only allow text to be viewed, showing only a limited number of postings and the like.

The security profile 214 includes parameters that define what type of postings are allowed or not allowed. In one embodiment, the owner may block any posting that includes derogatory language or images, postings about a specific topic, postings that include key words specified by the owner and the like. For example, the owner may not want any postings that include bad language. Thus, the owner may configure the security profile 214 to look for specific four letter words or images that contain explicit content. In another example, the owner may not want to offend other third party users about various topics, such as politics, and block any postings that are related to the various topics.

It should be noted that the above examples are not limiting. Ultimately, what is considered derogatory or explicit is controlled by the owner of the page. Thus, the security profile 214 is flexible enough to prevent whatever information the owner of the page does not want posted on their pages of one or more social networking sites.

The relationship profile 216 includes one or more other third party users that are accepted by the owner. The relationship profile 216 includes an associated relationship relative to the owner (e.g. friend, family, co-worker, acquaintance, etc). In addition, the relationship profile 216 may include a different access level based upon their relationship.

For example, the owner may allow all family members who are listed in the relationship profile 216 to have general access to post whatever they would like, within the limits of the security profile 214, to the owner's pages of one or more of the third party applications 120₁-120ₙ. However, the owner may provide acquaintances read only access to the owner's pages of one or more of the third party applications 120₁-120ₙ.

The relationship profile 216 serves as a global "friends" list for all of the owner's pages of one or more of the third party applications 120₁-120ₙ. In other words, rather than maintaining a list of accepted third party users separately on each one of the third party applications 120₁-120ₙ, the owner may maintain a single list as part of the owner profile 210 that applies to all of the owner's pages of one or more of the third party applications 120₁-120ₙ.

The owner may define which third party applications 120₁-120ₙ each accepted third party user may have access to. For example, the owner may want friends and family to have access to all of the owner's pages of the third party applications 120₁-120ₙ. However, the owner may want co-workers to only have access to a specific third party application 120 (e.g. a LinkedIn® page or a personal page on a corporate web site).

In addition, the relationship profile 216 can define which of the accepted third party users an accepted third party user can communicate with. In other words, the owner can control which accepted third parties users can interact with one another. Thus, the relationship profile 216 establishes a hub and spoke arrangement, wherein the owner can control which spokes another spoke can associate with.

For example, the owner may know that a first accepted third party user dislikes a second accepted third party user on the owner's relationship profile 216. As a result, the owner can prevent interaction between these accepted third party users when both are accessing an owner's page of one of the third party applications 120.

The order of posting profile 218 allows an owner to define the order of postings based upon the accepted third party user that provided the posting. Current social network sites typically post information on a page in a time ordered sequence. That is, the most recent posting is generally on top and subsequent posts are older.

However, the owner may feel that certain accepted third party users' posts are more important to them than other accepted third party users. As a result, the owner may define how postings should be ordered. For example, the owner may want all postings from friends and family to be posted first. As a result, even if a co-worker posts information on the owner's page, the co-worker's post would still be published below any postings from friends and family of the owner even though the co-worker's post at the time is the most recent.

The owner may define a different order for each page of the third party applications $120_1$-$120_n$. For example, third party application $120_1$ may be a Facebook® page and the owner may want friends and family posts to be listed first. In contrast, the third party application $120_2$ may be a LinkedIn® page and the owner may want business contacts or co-worker posts to be listed first.

The queue 220 provides a place for posting requests to be held or stored for review by the owner. For example, the security profile 214 may not be able to catch all types of derogatory statements or inappropriate comments. As a result, the queue 220 may provide another backstop for the owner to allow the owner to review all the posting requests from third party users 250. This allows the owner to provide a final review and ultimate permission or denial of the posting request.

In one embodiment, the owner may default all requests for posting information from a third party user 250 to be stored in the queue 220 until the owner reviews the request. In another embodiment, the owner may only require that requests that passed the security profile 214 be stored in the queue 220 for one final review by the owner before posting. The queue 220 may comprise any type of memory or computer storage medium that is part of the application server 112, such as a temporary memory cache, RAM, ROM, hard disk drive and the like.

In one embodiment, the owner profile 210 may be used to determine whether or not the owner wants to join another user's social network. For example, the owner profile 210 of a first user may be compared against a user profile of a second user. The first user may define in the security profile 214 of the owner profile 210 that they do not want any derogatory language. However, the user profile of a second user may allow derogatory language to be posted to their page associated with a social networking site. As a result, the first user may decline to join the second user's social network due to this discrepancy in their user profiles.

Thus, with the various parameters associated with the owner profile 210 and the sub-profiles 212-220 in the owner profile 210, the owner profile 210 serve as a gateway for postings to one or more of the owner's pages on the third party applications $120_1$-$120_n$. As a result, the owner is provided complete control over what is posted on their page of a social networking site. The present disclosure allows a page owner of a social networking site to stop derogatory or offensive postings before they are published on their page.

As a result, the posted information requested by the third party 250 is actually generated and posted on the owner's page of a third party application $120_1$-$120_n$ by the owner. In other words, the information posted on the owner's page of a third party application $120_1$-$120_n$ is not generated by the third party user 250 making the request to post information. For example, in one embodiment if a third party user's request to post information is approved by the owner profile 210, then the owner may generate and post the information on their page. Alternatively, the owner may have the application server 112 automatically generate and post the approved information on the owner's page on behalf of the owner. Thus, the present disclosure provides an owner complete control of their social networking sites.

Figure 3:
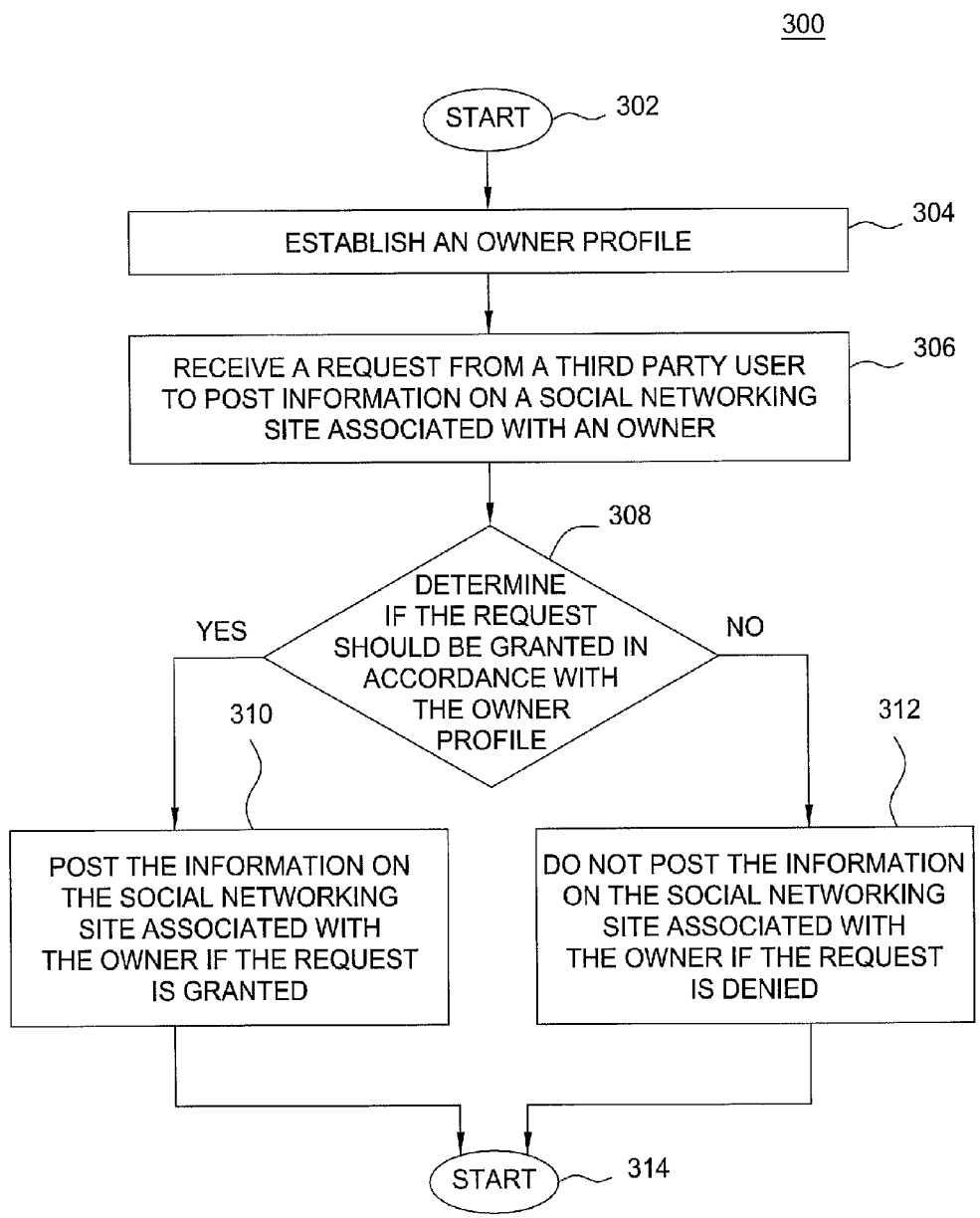
FIG. 3 illustrates a flowchart of a method for providing control of social networking sites.

FIG. 3 illustrates a flowchart of a method 300 for providing control of social networking sites. In one embodiment, one or more steps of the method 300 may be implemented by the application server 112 storing one or more profiles of the system 200 or a general purpose computer having a processor, a memory and input/output devices as discussed below with reference to FIG. 4.

The method 300 begins at step 302. At step 304, the method 300 establishes an owner profile. As discussed above, the owner of a page on a social networking site may establish an owner profile 210 and one or more of the associated sub profiles 212-220. The owner may configure the owner profile 210 and one or more of the associated sub profiles 212-220 via any type of interface discussed above, e.g., a GUI, a IVR system or a service representative of the service provider.

At step 306, the method 300 receives a request from a third party user to post information on a social networking site associated with the owner. The information may be any type of information, e.g., a comment, a picture, a video, a link to another webpage, and the like.

At step 308, the method 300 determines if the request should be granted in accordance with the owner profile. As discussed above, the request and the content of the information in the request is examined. If the information contains any information that violates the owner profile 210, then the request is denied. For example, the third party user may not be an accepted third party user that is listed in the relationship profile 216. The information may contain information that is banned by the security profile 214. Alternatively, the request may be stored in queue 220 and upon later review by the owner, at which time the user may not want to publish the information in the request for whatever reason.

If the request is denied, the method 300 proceeds to step 312. At step 312, the method 300 does not post the information on the social networking site associated with the owner if the request is denied. The method 300 proceeds to step 314 where the method 300 ends.

However, if the request is granted, the method 300 proceeds to step 310. At step 310, the method 300 posts the information on the social networking site associated with the owner if the request is granted. The method 300 then proceeds to step 314 where the method 300 ends.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Figure 4:
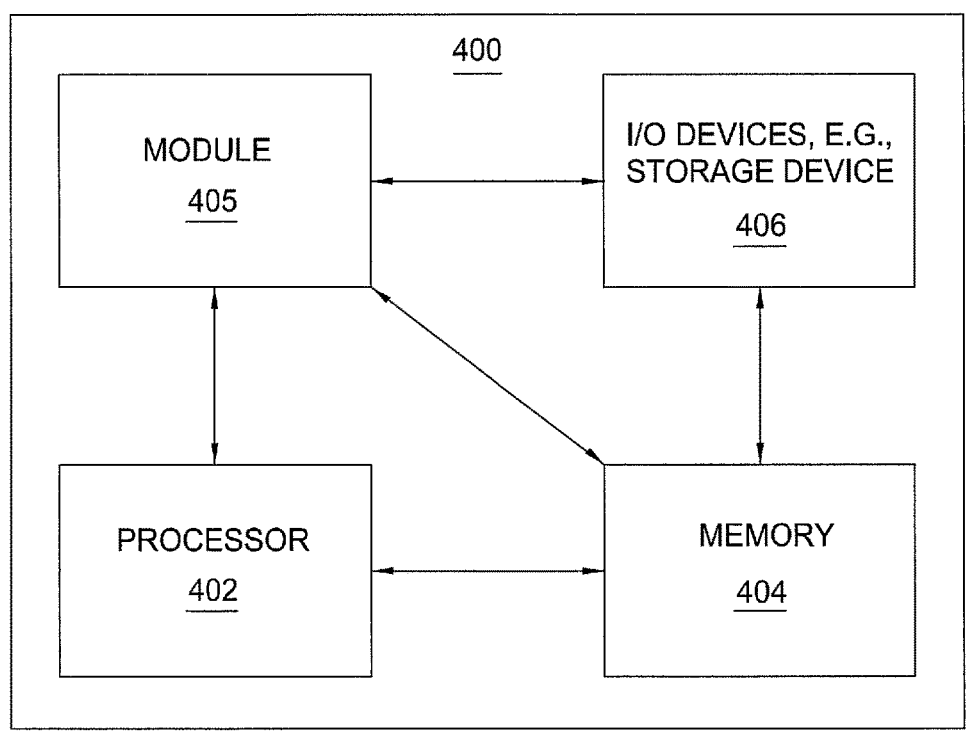
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing control of social networking sites, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for providing control of social networking sites can be loaded into memory 404 and executed by processor 402 to implement the functions as discussed above. As such, the present method 405 for providing control of social networking sites (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving, by a processor, a request from a third party user for permission to post information on a social networking site associated with an owner, wherein the information is not posted on the social networking site associated with the owner until the request is granted, wherein the third party user and the owner are different entities;
    determining, by the processor, if the request should be granted in accordance with an owner profile, wherein the owner profile comprises a relationship profile and a security profile, wherein the relationship profile comprises a plurality of approved third party users and a plurality of relationship types, the plurality of relationship types comprising at least two of: a friend relationship type, a family relationship type, a co-worker relationship type, or an acquaintance relationship type, wherein the security profile defines what type of information can be posted on the social networking site associated with the owner, wherein the owner profile is used for posting the information; and
    posting, by the processor, the information on the social networking site associated with the owner when the request is granted.

2. The method of claim 1, wherein the owner profile further comprises an application profile indicating how the information is to appear upon the posting or is to be encoded for the posting and an order of posting profile.

3. The method of claim 2, wherein the order of posting profile comprises an order of postings based upon an approved third party user of the plurality of approved third party users as defined by the owner.

4. The method of claim 1, wherein the receiving further comprises:
    holding the information in a queue for the owner to review the information.

5. The method of claim 1, wherein the determining further comprises:
    receiving permission from the owner to post the information.

6. The method of claim 1, wherein the posting of the information from the third party user is originated from the owner and not the third party user.

7. A non-transitory computer-readable medium storing a plurality of instructions which, when executed by a processor, cause the processor to perform operations, the operations comprising:
    receiving a request from a third party user for permission to post information on a social networking site associated with an owner, wherein the information is not posted on the social networking site associated with the owner until the request is granted, wherein the third party user and the owner are different entities;
    determining if the request should be granted in accordance with an owner profile, wherein the owner profile comprises a relationship profile and a security profile, wherein the relationship profile comprises a plurality of approved third party users and a plurality of relationship types, the plurality of relationship types comprising at least two of: a friend relationship type, a family relationship type, a co-worker relationship type, or an acquaintance relationship type, wherein the security profile defines what type of information can be posted on the social networking site associated with the owner, wherein the owner profile is used for posting the information; and
    posting the information on the social networking site associated with the owner when the request is granted.

8. The non-transitory computer-readable medium of claim 7, wherein the owner profile further comprises an application profile indicating how the information is to appear upon the posting or is to be encoded for the posting and an order of posting profile.

9. The non-transitory computer-readable medium of claim 8, wherein the order of posting profile comprises an order of postings based upon an approved third party user of the plurality of approved third party users as defined by the owner.

10. The non-transitory computer-readable medium of claim 7, wherein the receiving further comprises:
    holding the information in a queue for the owner to review the information.

11. The non-transitory computer-readable medium of claim 7, wherein the determining further comprises:
    receiving permission from the owner to post the information.

12. The non-transitory computer-readable medium of claim 7, wherein the posting of the information from the third party user is originated from the owner and not the third party user.

13. An apparatus, comprising:
a processor; and
a computer-readable medium storing a plurality of instructions which, when executed by the processor, cause the processor to perform operations, the operations comprising:
  receiving a request from a third party user for permission to post information on a social networking site associated with an owner, wherein the information is not posted on the social networking site associated with the owner until the request is granted, wherein the third party user and the owner are different entities;
  determining if the request should be granted in accordance with an owner profile, wherein the owner profile comprises a relationship profile and a security profile, wherein the relationship profile comprises a plurality of approved third party users and a plurality of relationship types, the plurality of relationship types comprising at least two of: a friend relationship type, a family relationship type, a co-worker relationship type, or an acquaintance relationship type, wherein the security profile defines what type of information can be posted on the social networking site associated with the owner, wherein the owner profile is used for posting the information; and
  posting the information on the social networking site associated with the owner when the request is granted.

14. The apparatus of claim 13, wherein the owner profile further comprises an application profile indicating how the information is to appear upon the posting or is to be encoded for the posting and an order of posting profile.

15. The apparatus of claim 14, wherein the order of posting profile comprises an order of postings based upon an approved third party user of the plurality of approved third party users as defined by the owner.

16. The apparatus of claim 13, wherein the receiving further comprises:
  holding the information in a queue for the owner to review the information.

17. The apparatus of claim 13, wherein the determining further comprises:
  receiving permission from the owner to post the information.

18. The apparatus of claim 13, wherein the posting of the information from the third party user is originated from the owner and not the third party user.

* * * * *